United States Patent
Milling

[11] 4,069,672
[45] Jan. 24, 1978

[54] WASTE HEAT CONVERTER FOR AN INTERNAL COMBUSTION ENGINE

[76] Inventor: Robert W. Milling, 831 Richmond Hill Drive, Marietta, Ga. 30067

[21] Appl. No.: 744,496

[22] Filed: Nov. 24, 1976

[51] Int. Cl.$^2$ .................... F01K 23/06; F01K 23/10
[52] U.S. Cl. ........................................ 60/618; 60/649
[58] Field of Search ............... 60/616, 617, 618, 511, 60/649, 651, 671

[56] References Cited

U.S. PATENT DOCUMENTS

| | | | |
|---|---|---|---|
| 453,444 | 6/1891 | Horack | 60/649 |
| 1,961,786 | 6/1934 | Roe | 60/649 |
| 3,228,189 | 1/1966 | Baker | 60/618 |
| 3,830,062 | 8/1974 | Morgan et al. | 60/618 |

FOREIGN PATENT DOCUMENTS 294,882  9/1929  United Kingdom.

*Primary Examiner*—Carlton R. Croyle
*Assistant Examiner*—L. J. Casaregola
*Attorney, Agent, or Firm*—Joseph E. Rusz; Richard J. Killoren

[57] ABSTRACT

A waste heat recovery system for an internal combustion engine having a mixture of ammonia and water used in the cooling system. The hose and radiator portion of the cooling system is protected from high pressures within the water jacket by a pressure regulator valve. A pump is provided for pumping the coolant from the low pressure system to the high pressure system. Water vapor leaving the water jacket with the ammonia vapor is removed and returned to the water jacket by means of a rectifier. The ammonia vapor is super heated by engine exhaust gases and is then used to drive a turbine. The ammonia gas which has been cooled by expansion in the turbine is used to cool a secondary fluid before the ammonia is returned to the radiator absorber. The secondary fluid cooled by the returning ammonia vapor is used to provide cooling for the rectifier.

3 Claims, 2 Drawing Figures

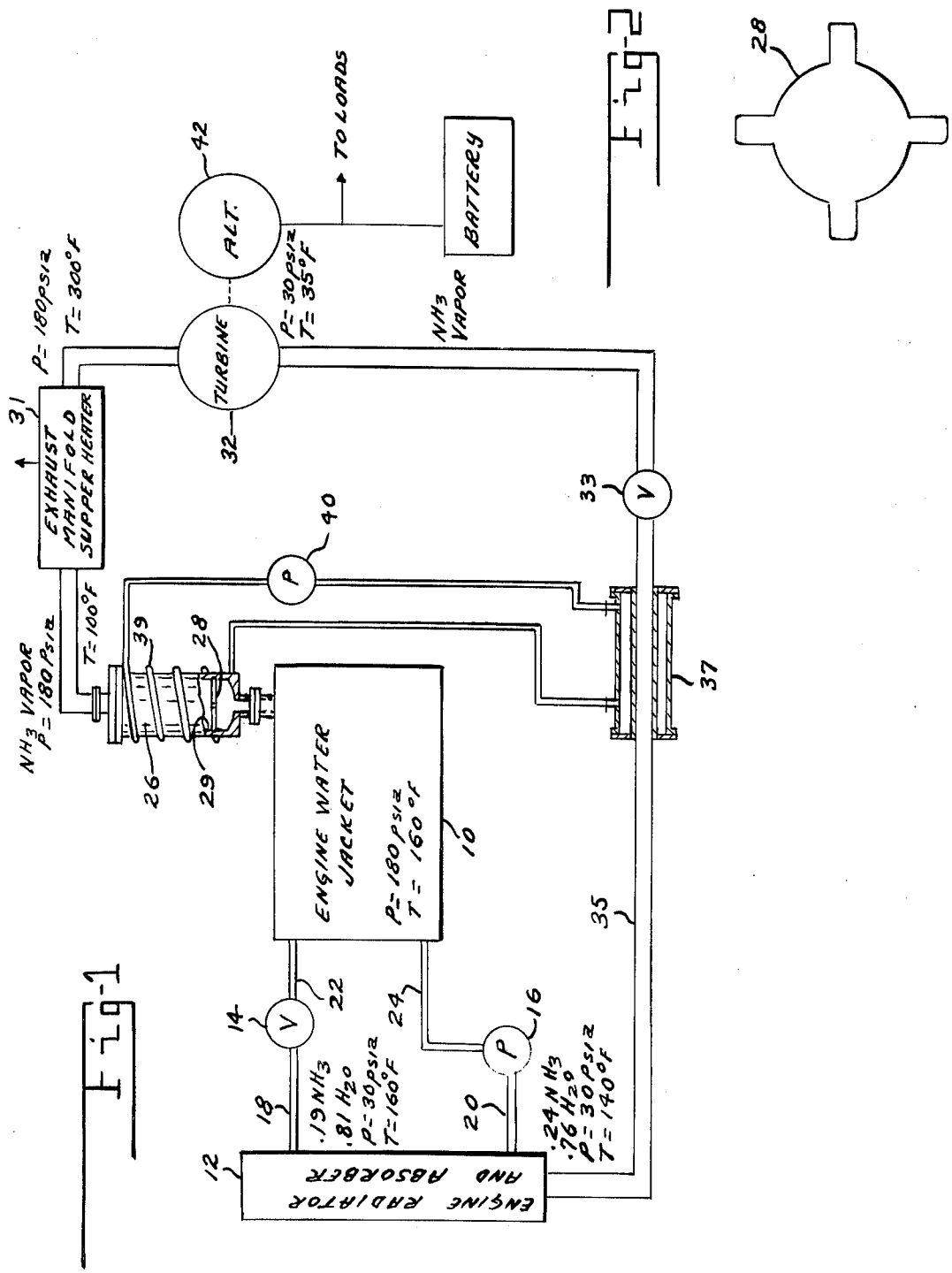

4,069,672

WASTE HEAT CONVERTER FOR AN INTERNAL COMBUSTION ENGINE

RIGHTS OF THE GOVERNMENT

The invention described herein may be manufactured and used by or for the Government of the United States for all governmental purposes without the payment of any royalty.

BACKGROUND OF THE INVENTION

This invention relates to a waste heat recovery system for an internal combustion engine.

Efforts to decrease fuel consumption by increased consumption efficiency have been hampered by the need to reduce emissions. Another means for decreasing fuel consumption is by increasing the useful output of the engine.

The U.S. Pat. Nos. to Baker, 3,228,189; Johnson, 3,350,876 and Morgan et al, 3,830,062, disclose systems for using waste heat of an internal combustion engine to run a turbine to drive accessories. The British patent, 294,882, discloses a vapor cycle system for converting heat energy into mechanical work.

In the past it has been considered impractical to use a vapor cycle system wherein the binary coolant is passed through the internal combustion engine cooling system because of the high pressures that would be required in the engine cooling system.

BRIEF SUMMARY OF THE INVENTION

According to this invention, the ammonia absorption cycle is utilized to extract waste heat from an internal combustion engine and for converting the waste heat to work. The high pressures required in the ammonia cycle are restricted to the water jacket with the remainder of the cooling system being protected from the high pressures with pressure regulator valves. The ammonia gas passes from the water jacket through a rectifier to remove the water vapor and then to an exhaust manifold superheater. The superheated vapor is then used to run a turbine. After expansion in the turbine, the cooled ammonia vapor is returned to the cooling system through a second pressure regulator valve.

A secondary cooling circuit is provided between a heat exchanger in the cooled vapor return line and the rectifier in the output of the water jacket.

IN THE DRAWINGS

FIG. 1 is a schematic diagram showing a waste heat recovery system according to the invention.

FIG. 2 is an enlarged plan view of the baffle plate used in the rectifier of the device of FIG. 1.

DETAILED DESCRIPTION OF THE INVENTION

Reference is now made to FIG. 1 of the drawing wherein a conventional internal combustion engine cooling system is represented by an engine water jacket 10 and a radiator 12. The coolant used in the water jacket is a mixture of 24% ammonia and 76% water by weight. The water jacket is constructed to withstand high pressures. The parts of the cooling external to the water jacket, such as hoses and radiator are protected from the high pressures by means of a pressure regulator valve 14. A pump 16 pumps the coolant in the low pressure portion of the cooling system into the high pressure system. Lines 18 and 20 represent the low pressure connecting lines. High pressure lines 22 and 24 are used between the pressure regulator valve and the water jacket and between the pump and the water jacket.

Heat added to the coolant in the water jacket raises the temperature and pressure to about 160° F. and 180 psia. With an increase in temperature in the cooling jacket, some of the ammonia is released from the water and passes through a conventional rectifier 26. A baffle 28 in the rectifier causes the vapor to flow along the wall 29 which is cooled in a manner to be described below. Any water vapor which leaves the water jacket with the ammonia vapor is condensed on the cool walls of the rectifier and flows back into the water jacket. The ammonia vapor is cooled a small amount in the rectifier. The ammonia vapor passes through an exhaust gas manifold superheater 31 where it is heated to about 300° F. The high temperature, high pressure ammonia vapor is then used to run a turbine 32 in a conventional manner as in the British patent.

After expansion through the turbine, the vapor leaves the turbine at a pressure of about 30 psia and a temperature of about 35° F. The ammonia vapor is then returned to radiator 12 which is also used as an absorber. A regulator valve 33 is provided in the return line 35 to protect the low pressure system against any pressure surges.

A secondary heat exchanger 37 is provided in the return line 35. A secondary cooling liquid, such as water is pumped through the heat exchanger 37 and through rectifier cooling coils 39 by means of a pump 40. Pumps 16 and 40 may be run by belt from the internal combustion engine or may be driven by electric motors. The turbine can be used to run an alternator 42, a power steering unit, an air conditioner unit or other equipment.

In the operation of the device of the invention after the internal combustion engine is started, the heat added to the water ammonia coolant raises its temperature and pressure. As the ammonia vapor separates from the water, it passes through rectifier 26 where water vapor is removed and returned to the water jacket. The ammonia vapor passes through exhaust manifold superheater 31 which further raises the temperature of the ammonia vapor. The high temperature, high pressure ammonia vapor then runs turbine 32. After expansion through the turbine, the ammonia temperature and pressure drop to about 35° F. and 30 psia. The cool vapor passes through heat exchanger 37 and then to radiator absorber 12. The secondary coolant is pumped through heat exchanger 37 where it is cooled by the cool return ammonia vapor. The secondary coolant supplies cooling for the rectifier 26. Pressure regulator valves 14 and 33 protect the low pressure portion of the cooling system.

There is thus provided a system which makes use of ammonia absorption cycle for extracting waste heat from an internal combustion engine cooling system and which converts the waste heat to work.

I claim:

1. A waste heat recovery system for an internal combustion engine; comprising: an engine cooling system including a water jacket and a radiator; a coolant mixture in said cooling system; said coolant mixture including water and ammonia; said cooling system including a high pressure system including said water jacket and a low pressure system including said radiator; a pressure regulator valve connected between said high pressure system and said low pressure system for limiting the pressure in the low pressure system; a turbine engine; means for supplying ammonia vapor from said water jacket to said turbine engine; said means for supplying ammonia vapor to the turbine engine including means for superheating the ammonia vapor with the exhaust gas from the internal combustion engine; a return line connected between the turbine engine and said radiator for returning the ammonia vapor to the radiator for absorption by the water ammonia mixture in the radiator; a pump connected between said radiator and said water jacket for returning coolant from the radiator to the water jacket.

2. The device as recited in claim 1 including a rectifier connected between the water jacket and said superheater; a heat exchanger in the return line between the turbine and the radiator; means for passing a secondary coolant through said heat exchanger and said rectifier to cool the rectifier to thereby remove water vapor from the ammonia vapor before passing the ammonia vapor to said superheater.

3. The device as recited in claim 2 including a regulator valve connected between the turbine and said heat exchanger for limiting the pressure of the ammonia vapor entering said radiator through said return line.

* * * * *